United States Patent
Moeckel

(10) Patent No.: US 6,604,362 B2
(45) Date of Patent: Aug. 12, 2003

(54) TURBOCHARGER ELECTRIC PREHEATER FOR EXHAUST GASES WITH INTEGRATED GENERATOR AND STORAGE DEVICE

(75) Inventor: Mark D. Moeckel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/023,555

(22) Filed: Dec. 17, 2001

(65) Prior Publication Data

US 2003/0110769 A1 Jun. 19, 2003

(51) Int. Cl.[7] .......................... F02B 37/02; F02B 33/44; F01N 7/00; F01N 7/08
(52) U.S. Cl. .............................. 60/614; 60/280; 60/618
(58) Field of Search .................. 60/602, 614, 618, 60/280

(56) References Cited

U.S. PATENT DOCUMENTS

| | | |
|---|---|---|
| 3,928,971 A | 12/1975 | Spath |
| 4,366,674 A | 1/1983 | Eakman |
| 4,610,141 A | 9/1986 | Wang |
| 4,769,993 A | 9/1988 | Kawamura |
| 4,850,193 A | 7/1989 | Kawamura |
| 5,079,913 A | 1/1992 | Kishishita |
| 5,168,706 A | 12/1992 | Kawamura |

FOREIGN PATENT DOCUMENTS

JP   57-151021   9/1982

*Primary Examiner*—Sheldon J. Richter
(74) *Attorney, Agent, or Firm*—Todd T Taylor

(57) ABSTRACT

An electrical preheater for a turbine inlet of a turbocharger for an internal combustion engine. An electric motor/generator is drivingly coupled to the turbocharger, and electrically connected to a storage device. The electrical preheater is powered by the storage device to heat a stream of exhaust gases entering the turbocharger turbine from the engine exhaust manifold. The preheater provides an additional control of the turbocharger performance.

12 Claims, 1 Drawing Sheet

TURBOCHARGER ELECTRIC PREHEATER FOR EXHAUST GASES WITH INTEGRATED GENERATOR AND STORAGE DEVICE

TECHNICAL FIELD

The present invention relates to turbochargers for internal combustion engines, and, more particularly to apparatus and methods for controlling the performance of the turbine of a turbocharger.

BACKGROUND

The amount of combustion air that can be delivered to the intake manifold of an internal combustion engine, for combustion in the engine cylinders, is a limiting factor in the performance of the engine. Atmospheric pressure is often inadequate to supply the required amount of air for proper and efficient operation of an engine.

Therefore, it is known to equip an internal combustion engine with one or more turbochargers for compressing air to be supplied to one or more combustion chambers within corresponding combustion cylinders. The turbocharger supplies combustion air at a higher pressure and higher density than existing atmospheric pressure and ambient density. The use of a turbocharger can compensate for lack of power due to altitude, or to increase the power that can be obtained from an engine of a given displacement, thereby reducing the cost, weight and size of an engine required for a given power output.

Each turbocharger typically includes a turbine driven by exhaust gases from the engine, and one or more compressors driven by the turbine through a turbocharger shaft common to both the turbine and the compressor or compressors. The common shaft interconnects the turbine wheel of the turbine with the compressor wheel or wheels in the compressor section. A stream of exhaust gases from the engine is conducted from the exhaust manifold to the turbine. The stream of exhaust gases passing through the turbine causes the turbine wheel to rotate, thereby turning the common shaft interconnecting the turbine wheel and the compressor wheels and rotating the compressor wheels. The compressor receives the fluid to be compressed, which may be combustion air only or a mixture of combustion air and fuel, and supplies compressed fluid to the intake manifold of the engine.

It is known to condition the boost air flowing from the compressor or compressors, to affect the overall turbocharger performance, and or the engine efficiency. In turbochargers having multi-stage compressors, compressing the air in the first compressor significantly raises the temperature of the air, increasing the power required by the second compressor to achieve a desired pressure boost. To overcome the detrimental effects of the increase in temperature, so-called "intercoolers" have been provided in the flow path between the first compressor outlet and the second compressor inlet. Similarly, so-called "aftercoolers" have been used after the turbocharger in turbochargers having both single-stage and multi-stage compressors. The aftercooler cools the compressed air supplied to the intake manifold, thereby increasing the oxygen content per unit volume to better support combustion in the cylinders, and decrease engine operating temperatures.

On the turbine side, it has been known to control exhaust flow to and from the turbine, using controllable vanes, to thereby affect overall turbocharger performance. Nozzles in both the inlet throat and the nozzle exit have been used. However, the controllable vane structures are expensive, and, as somewhat complex mechanical devices, can experience mechanical failures.

Under certain engine operating condition changes, turbocharger response can be slow in achieving the desired corresponding change in turbocharger performance. Desirably, the turbocharger will provide the required level of pressure boost, respond quickly to load changes, and function efficiently under both high load and low load conditions. This can be difficult to achieve efficiently, especially for an engine having a wide range of operating loads. If sized for full load conditions, the turbocharger responds slowly and provides minimal boost under low load conditions. Alternatively, improved response and boost under low load conditions can be achieved by providing a turbocharger that exceeds high load requirements, and using a waste gate to bypass excess exhaust flow when desired performance is reached. However, energy in the bypassed gas stream is wasted, and engine back-pressure is increased.

U.S. Pat. No. 4,769,993 discloses a turbocharger for internal combustion engines that includes a motor/generator integral with the compressor and turbine. In response to engine operating conditions, the motor/generator can be operated as a generator, supplying electric current to electrical storage batteries, and electrical systems of the engine or implement in which the engine is used. Under other operating conditions, the motor/generator can be operated as a motor, supplying torque to the turbine shaft to increase turbocharger performance.

The present invention is directed to overcoming one or more of the problems as set forth above.

SUMMARY OF THE INVENTION

In one aspect thereof, the invention provides an internal combustion engine with a plurality of combustion cylinders; an exhaust manifold coupled with at least some cylinders of the plurality of combustion cylinders; and an intake manifold coupled with the plurality of combustion cylinders. A turbocharger includes a turbine having a turbine inlet coupled with the exhaust manifold and a turbine outlet. A compressor has a compressor inlet and a compressor outlet. The compressor outlet is coupled with the intake manifold. A preheater is associated with the turbine inlet.

In another aspect thereof, the invention provides a turbocharger system with a turbine shaft; a turbine having a turbine casing defining a turbine inlet and a turbine outlet, and a turbine wheel mounted on the shaft and operatively disposed in the turbine casing; and a compressor having a compressor casing defining a compressor inlet and a compressor outlet, and a compressor wheel mounted on the shaft and operatively disposed in the compressor casing. A preheater is associated with the turbine inlet.

In yet another aspect thereof, the invention provides a method for turbocharging an internal combustion engine, having a plurality of combustion cylinders, an exhaust manifold and an intake manifold. The method includes steps of transporting exhaust gas from the combustion cylinders to the exhaust manifold; providing a turbocharger including a turbine having a turbine inlet and a turbine outlet, and a compressor having a compressor inlet and a compressor outlet; providing a preheater associated with the turbine inlet; driving the turbine with exhaust gas introduced at the turbine inlet; introducing combustion gas at the compressor inlet; transporting combustion gas from the compressor outlet to the intake manifold; and heating exhaust gas introduced at the turbine inlet.

In still another aspect thereof, the invention provides a method for operating a turbocharger, including steps of providing a turbocharger including a turbine having a turbine inlet and a turbine outlet, and a compressor having a compressor inlet and a compressor outlet; providing a fluid stream to the turbine inlet; driving the turbine with the fluid stream introduced at the turbine inlet; and heating the fluid stream entering the turbine inlet.

DETAILED DESCRIPTION

Figure 1:
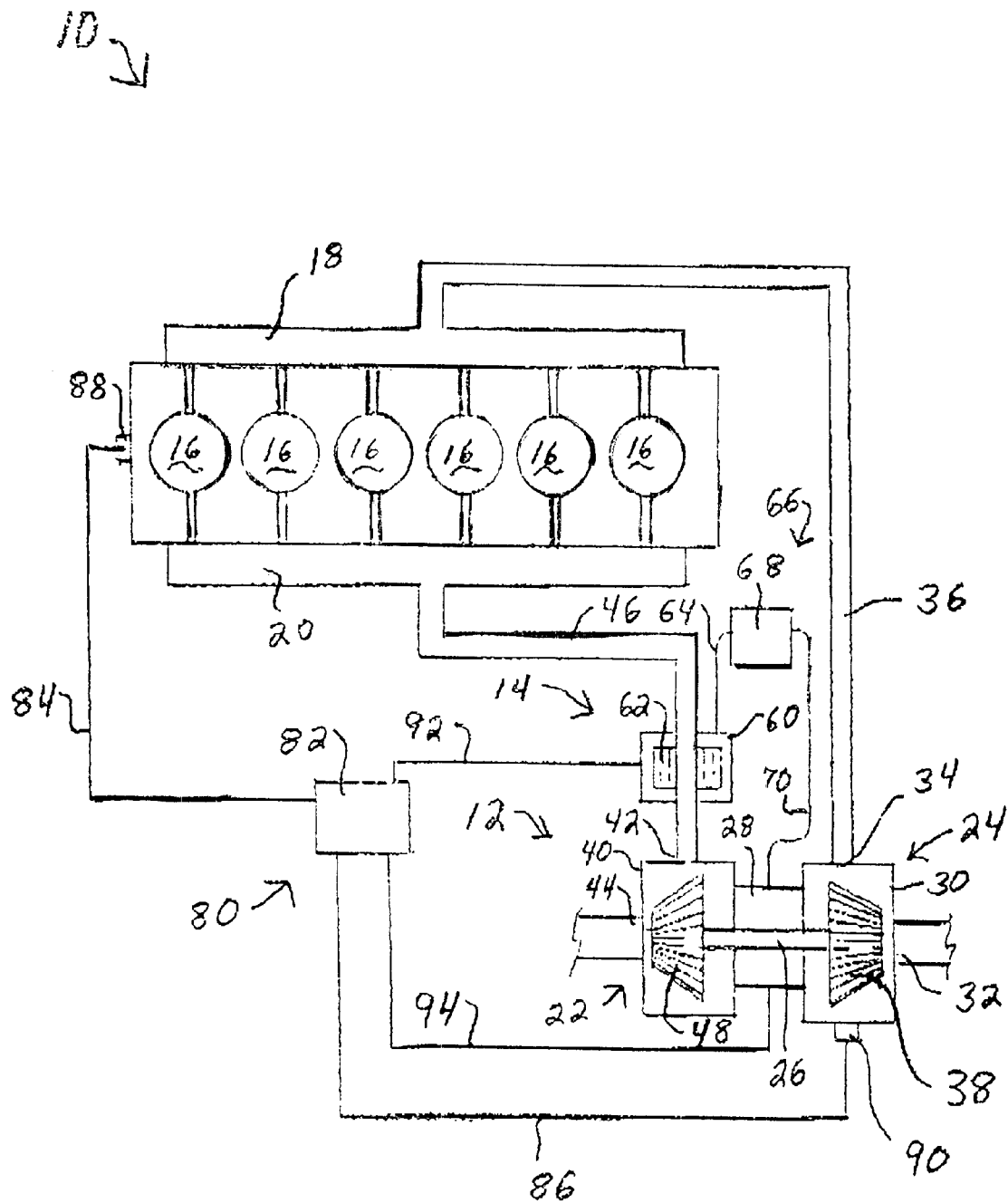
FIG. 1 is a schematic illustration of an internal combustion engine having a turbocharger with an electric preheater for exhaust gases in accordance with the present invention.

Referring now to the drawing, FIG. 1 illustrates an internal combustion engine 10, including a turbocharger 12 having an integrated turbine preheating system 14 in accordance with the present invention.

Internal combustion engine 10 includes a plurality of combustion cylinders 16, and as shown in FIG. 1, includes six combustion cylinders 16, although more or fewer combustion cylinders 16 can be provided. Each combustion cylinder 16 is coupled with an intake manifold 18 and with an exhaust manifold 20. While a single intake manifold 18 is shown, it should be understood that more than one intake manifold may be used, with each intake manifold 18 coupled to a plurality of combustion cylinders 16, for providing an air mixture to each combustion cylinder 16. Further, while a single exhaust manifold 20 is shown, it should be understood that more than one exhaust manifold may be provided, with each exhaust manifold coupled to a different plurality of combustion cylinders 16. A fuel, such as diesel fuel, is injected into each combustion cylinder and combusted therein, in a known manner.

Turbocharger 12 includes a turbine 22, and a compressor 24 interconnected by a common turbocharger shaft 26. A motor/generator 28 is provided, having a rotor (not shown) also mounted on shaft 26. Motor/generator 28 is shown mounted between turbine 22 and compressor 24; however, it should be understood that motor/generator 28 could be mounted otherwise with respect to turbine 22 and compressor 24, such as, for example, in front of compressor 24.

Compressor 24 includes a compressor casing 30 defining a compressor inlet 32 and a compressor outlet 34. Compressor inlet 32 receives combustion gas from a source such as ambient air, and compressor outlet 34 supplies compressed combustion gas to intake manifold 18 of engine 10 through a conduit 36. Compressor 24 includes a compressor wheel 38 mounted on turbocharger shaft 26, in known manner. While a single compressor 24 is shown, it should be understood that more than one compressor may be provided, each with a compressor wheel mounted on shaft 26, and having an interstage duct (not shown) connecting the compressors in series.

Turbine 22 includes a turbine casing 40 defining a turbine inlet 42 and a turbine outlet 44. Turbine inlet 42 is connected in flow communication with exhaust manifold 20 via a fluid conduit 46. A turbine wheel 48 is mounted on turbocharger shaft 26 in turbine casing 40. Turbine outlet 44 is connected to a further exhaust system (not shown) of engine 10, which may include one or more mufflers, with subsequent discharge to an ambient environment.

Preheating system 14 includes a preheater 60 associated with turbine inlet 42, to heat exhaust gas entering turbine 22. An exhaust gas stream from exhaust manifold 20 passes through preheater 60 before entering turbine 22. Preheater 60 may be provided in conduit 46, or may be provided adjacent or integral with turbine inlet 42. In a preferred embodiment, preheater 60 includes an electric heater element 62 connected via an electrical conductor 64 to an electric source 66, such as a storage battery 68.

Motor/generator 28 is connected via an electrical conductor 70 to storage battery 68. When operated as a motor, motor/generator 28 receives electrical power from storage battery 68. When operated as a generator, motor/generator 28 supplies electrical power to storage battery 68, and hence to electric preheater 60.

A control system 80 includes a controller 82 connected via signal lines 84 and 86 to one or more engine sensors 84 and one or more turbocharger sensors 86, respectively. Sensors 84 and 86 are adapted and installed to provide signal data to controller 82 relevant to one or more operating and/or performance criteria of engine 10 and turbocharger 12, respectively. Controller 82 provides operating and performance control inputs to preheater 60 and motor/generator 28 via signal lines 92 and 94, respectively.

While only a single engine sensor 84 and a single turbocharger sensor 86 are schematically illustrated in FIG. 1 for simplicity, those skilled in the art will recognize and understand that numerous sensor types may be required. Several different sensor types, at a variety of locations in engine 10 and turbocharger 12 may be required to provide appropriate signal inputs to controller 82. Such sensors are known to those skilled in the art, and will not be described in greater detail herein. Sensors 84 and 86 can be selected and positioned to generate a signal to controller 82 indicative of one or more conditions such as engine speed or load, intake manifold pressure, turbocharger speed, boost and barometric pressure.

INDUSTRIAL APPLICABILITY

During use of engine 10, a fuel, such as diesel fuel, is injected into combustion cylinders 16 and combusted when a piston (not shown) disposed within each combustion cylinder 16 is at or near a top dead center position. Exhaust gas is transported from each combustion cylinder 16 to exhaust manifold 20. At least a portion of the exhaust gas within exhaust manifold 20 is transported to conduit 46 and turbine inlet 42, to flow through turbine 22, for rotatably driving the turbine wheel (not shown). The spent exhaust gas is discharged from turbine 22 through turbine outlet 44. An exhaust gas recirculation (EGR) system (not shown) may be provided to re-circulate a portion of exhaust gas from exhaust manifold 20 to intake manifold 18, for the known advantages of EGR systems.

Turbine 22 transmits power to compressor 24 through shaft 26. Compressor 24 draws combustion air into compressor inlet 32. The combustion air is compressed within compressor 24, and is discharged from compressor 24 through compressor outlet 34 and conduit 36 to intake manifold 18. Those skilled in the art will understand that turbocharger 12 may include more than one compressor, with an interstage duct directing the combustion air from the first compressor to the second compressor, for further compression.

Operating condition data obtained from engine sensor 88 and turbocharger sensor 90 is transmitted to controller 82 via signal lines 84 and 86. If controller 82 determines that operating conditions are such that the performance of turbocharger 12 is adequate with power supplied only from an exhaust stream flowing in conduit 46, motor/generator 28 is operated in a generator mode. A voltage is induced and transmitted to storage battery 68 via electrical conductor 70, for use by electrical systems and apparatus, including preheater 60.

If engine and turbocharger operating conditions are such that the performance of turbocharger 12 is not adequate with power supplied only from an exhaust stream flowing in conduit 46, motor/generator 28 is operated in a motor mode. Electric power is supplied from storage battery 68 to motor/generator 28 via electrical conductor 70. Motor/generator 28 supplies torque to shaft 26, improving response and performance of turbocharger 12.

Operating preheater 60 supplies heat to an exhaust gas stream flowing through conduit 46, increasing the temperature of the exhaust gas stream. Increasing the temperature of the exhaust gas stream entering turbine 22 generates increased power to turbine wheel 48, improving turbocharger response. The capability of turbocharger 12 to supply compressed air can be varied by controlling heat supplied to the exhaust gas stream in conduit 46. Preheater 60 thereby provides an additional performance control for turbocharger 12.

Energy for the operation of preheater 60 is provided from the operation of turbocharger 12, through motor/generator 28, when energy from exhaust gas is sufficient to run motor/generator 28 in a generator mode and store energy in storage battery 68. The energy stored in storage battery 68 also may be used for other electrical systems of a vehicle, work machine or the like in which engine 10 is used.

Other aspects, objects and advantages of this invention can be obtained from a study of the drawings, the disclosure and the appended claims.

What is claimed is:

1. A method for turbocharging an internal combustion engine, having a plurality of combustion cylinders, an exhaust manifold and an intake manifold, said method comprising steps of:

transporting exhaust gas from the combustion cylinders to the exhaust manifold;

providing a turbocharger including a turbine having a turbine inlet and a turbine outlet, and a compressor having a compressor inlet and a compressor outlet;

providing a preheater associated with the turbine inlet;

driving the turbine with exhaust gas introduced at the turbine inlet;

introducing combustion gas at the compressor inlet;

transporting combustion gas from the compressor outlet to the intake manifold;

heating exhaust gas introduced at the turbine inlet;

sensing at least one of operating conditions of the engine and performance of the turbocharger; and controlling said heating step in response to said sensing step.

2. The method of claim 1, including providing an electric heater element in the preheater, and performing said heating step with the electric heater element.

3. The method of claim 2, including providing a generator operated by the turbine, and a battery electrically connected to the electric heater element, and charging the battery with the generator.

4. The method of claim 3, including providing the generator as a motor/generator, and operating the motor generator alternatively as a motor and as a generator in response to said sensing step.

5. An internal combustion engine, comprising:

a plurality of combustion cylinders;

an exhaust manifold coupled with at least some cylinders of said plurality of combustion cylinders;

an intake manifold coupled with said plurality of combustion cylinders;

a turbocharger including a turbine having a turbine inlet coupled with said exhaust manifold and a turbine outlet, a compressor having a compressor inlet and a compressor outlet, said compressor outlet coupled with said intake manifold;

a preheater associated with said turbine inlet, said preheater including an electric heater element connected to an electric source; and said electric source including a storage battery and a generator driven by said turbocharger and electrically connected to said storage battery.

6. The internal combustion engine of claim 5, said generator being a motor/generator, and said engine including a controller and a sensor connected to said controller, said sensor adapted and arranged for determining at least one of operating conditions of the engine and operating conditions of said turbocharger, said controller adapted to provide performance control of said preheater and said motor/generator.

7. The internal combustion engine of claim 5, including a turbocharger shaft interconnecting said turbine and said compressor, said motor/generator disposed on said shaft between said turbine and said compressor.

8. A turbocharger system, comprising:

a turbine shaft;

a turbine having a turbine casing defining a turbine inlet and a turbine outlet, and a turbine wheel mounted on said shaft and operatively disposed in said turbine casing;

a compressor having a compressor casing defining a compressor inlet and a compressor outlet, and a compressor wheel mounted on said shaft and operatively disposed in said compressor casing;

a preheater associated with said turbine inlet;

said preheater including an electric heater element connected to an electric source; and said electric source including a storage battery and a motor/generator mounted on said turbocharger shaft and electrically connected to said storage battery.

9. The turbocharger of claim 8, including a control system having a controller coupled to said motor/generator and to said preheater, and an engine sensor and a turbocharger sensor providing operating data to said controller.

10. The turbocharger of claim 8, said motor/generator mounted on said shaft between said compressor wheel and said turbine wheel.

11. A method for operating a turbocharger, comprising:

providing a turbocharger including a turbine having a turbine inlet and a turbine outlet, and a compressor having a compressor inlet and a compressor outlet;

providing a fluid stream to the turbine inlet;

providing a preheater associated with the turbine inlet;

driving the turbine with the fluid stream introduced at the turbine inlet;

heating the fluid stream entering the turbine inlet;

providing an electric heater element in the preheater, and performing said heating step with the electric heater element;

providing a generator operated by the turbine, and a battery electrically connected to the electric heater element; and charging the battery with the generator.

12. The method of claim 11, including providing the generator as a motor/generator, and operating the motor generator alternatively as a motor and as a generator.

* * * * *